United States Patent [19]
Burke et al.

[11] 3,844,948
[45] Oct. 29, 1974

[54] REACTOR FOR CONTINUOUS WET OXIDATION PROCESS

[75] Inventors: Harry Dennis Burke; George Boswinkle, both of St. Joseph, Mich.

[73] Assignee: Whirlpool Corporation, Benton Harbor, Mich.

[22] Filed: Dec. 4, 1972

[21] Appl. No.: 312,220

[52] U.S. Cl. ................ 210/152, 210/177, 210/181, 219/304
[51] Int. Cl. ............................................. B01d 33/30
[58] Field of Search ........ 55/268, 269; 210/63, 152, 210/175, 177, 181; 219/303, 304

[56] References Cited
UNITED STATES PATENTS

| | | | |
|---|---|---|---|
| 1,534,898 | 4/1925 | Bluemlein | 219/304 |
| 2,521,960 | 9/1950 | Arvintz et al. | 219/303 |
| 3,359,200 | 12/1967 | Gitchel et al. | 210/63 |
| 3,466,425 | 9/1969 | Gregg | 219/303 X |
| 3,697,417 | 10/1972 | Teletzke et al. | 210/63 X |

*Primary Examiner*—Samih N. Zaharna
*Assistant Examiner*—Robert H. Spitzer
*Attorney, Agent, or Firm*—Hill, Gross, Simpson, Van Santen, Steadman, Chiara & Simpson

[57] ABSTRACT

A reactor for a continuous process home sewage treatment system handling all organic wastes arising out of normal habitation of a domestic dwelling place by a wet oxidation process. The reactor is in the form of a pressure vessel in the form of a coil of tubing contained in an insulated vessel and having an inlet at one end for the raw waste entrained in water coming from the heat exchanger and forced along the tubing by air under pressure, the air providing the oxygen required for oxidation. Heat is added to the tubing by an electric heater having heating elements in intimate contact with the coil. The coil is of sufficient length that the raw waste introduced into the inlet end of the coil is completely oxidized as it leaves the coil, resulting in an effluent in the form of carbon dioxide, substantially clean water and a small amount of sterile ash. The length of the coil is proportioned to the flow rate to provide sufficient residence time in the reactor to complete the process.

9 Claims, 4 Drawing Figures

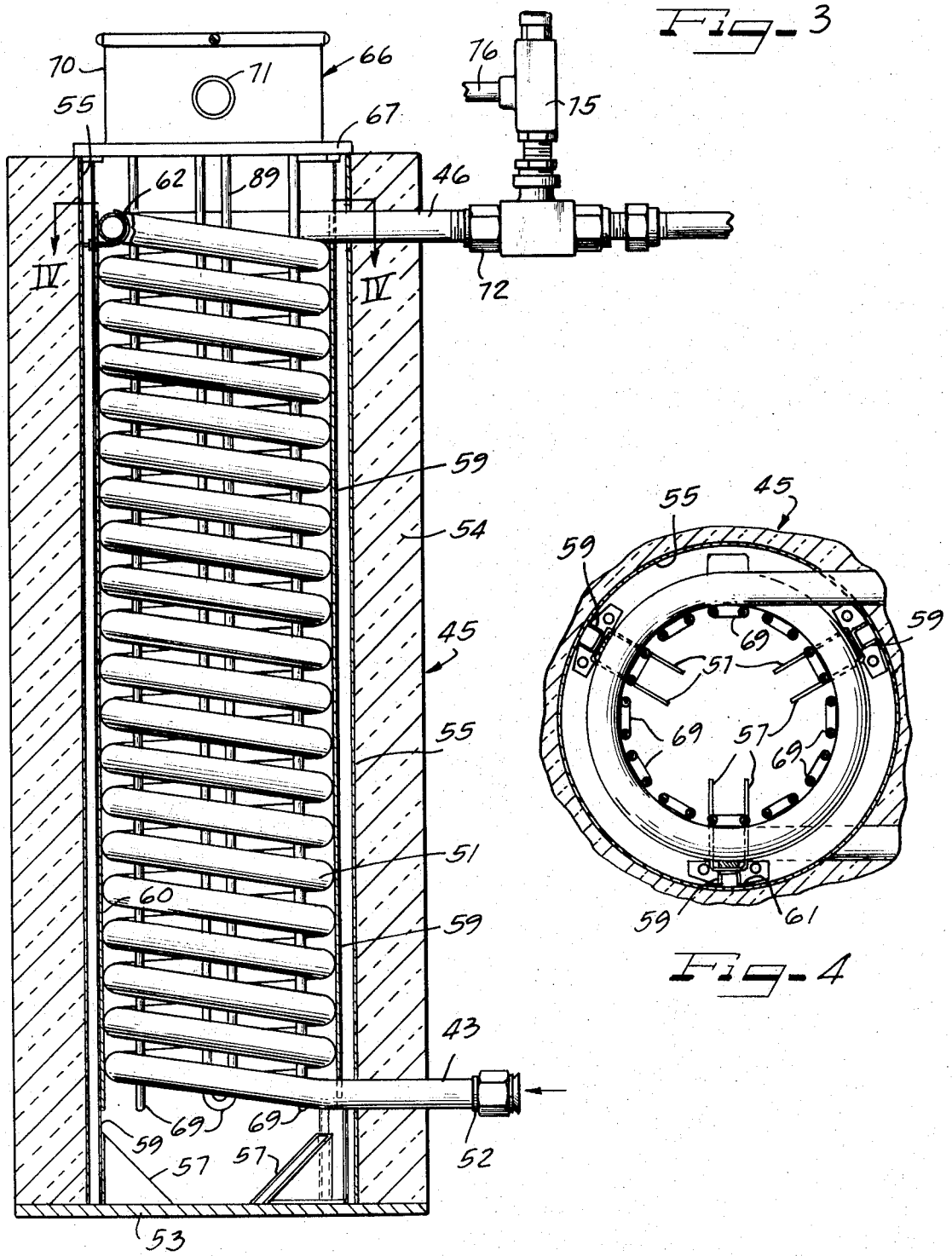

REACTOR FOR CONTINUOUS WET OXIDATION PROCESS

BACKGROUND OF THE INVENTION

1. The Field of the Invention

This invention relates generally to reactors for waste disposal systems.

2. The Prior Art

Wet oxidation systems for handling and disposing of municipal wastes are well-known. Such systems have included reactors operating on the principle that any substance capable of burning can be oxidized in the presence of water at increased temperatures and forced through the reactor by air under pressure.

SUMMARY OF THE INVENTION

The present invention concerns a continuous process reactor for such a system particularly adapted for a wet oxidation home sewage disposal process for elevating the temperature of the raw waste forced into the reactor, in the presence of air under pressure and in the form of a pressure vessel formed by a coil of tubing of sufficient length in proportion to the flow of influent through the tubing to provide a residence time sufficient to complete oxidation of all organic solids when the raw waste is pumped therethrough at a prescribed rate in the presence of oxygen supplied in air under increased pressure. Upon leaving the reactor, the effluent is separated into harmless gases which may be freely vented to the atmosphere, a small amount of sterile ash and a clarified supply of reusable water.

It is contemplated by the present invention to provide an improved and efficient form of continuous process reactor through which the raw waste may be forced at an elevated temperature and of sufficient length to completely oxidize the hot effluent, which may be connected to add thermal energy to the influent.

An advantage of the present invention, therefore, is the provision of a compact form of continuous reactor for home sewage treatment purposes in which the compactness of the reactor and efficiency of operation thereof is attained by the use of a coil as a pressure vessel for the reactor and by supplying heat to the coil by an electric heating unit in intimate contact therewith never allowing the coil to cool off.

A further advantage of the invention is that by utilizing a coil of tubing as a pressure vessel in contrast to a high pressure casting with thick walls, heretofore required in batch process reactors, and heating the coil by electric heating elements in contact therewith, the coil may be of sufficient length to complete the oxidation process of the influent, and still be sufficiently compact for home sewage disposal use.

BRIEF DESCRIPTION OF THE DRAWINGS

FIG. 3 is a sectional view taken through the reactor substantially along line III—III of FIG. 2; and FIG. 4 is a fragmentary cross sectional view taken substantially along line IV—IV of FIG. 3.

DESCRIPTION OF THE PREFERRED EMBODIMENT OF THE INVENTION

Figure 1:
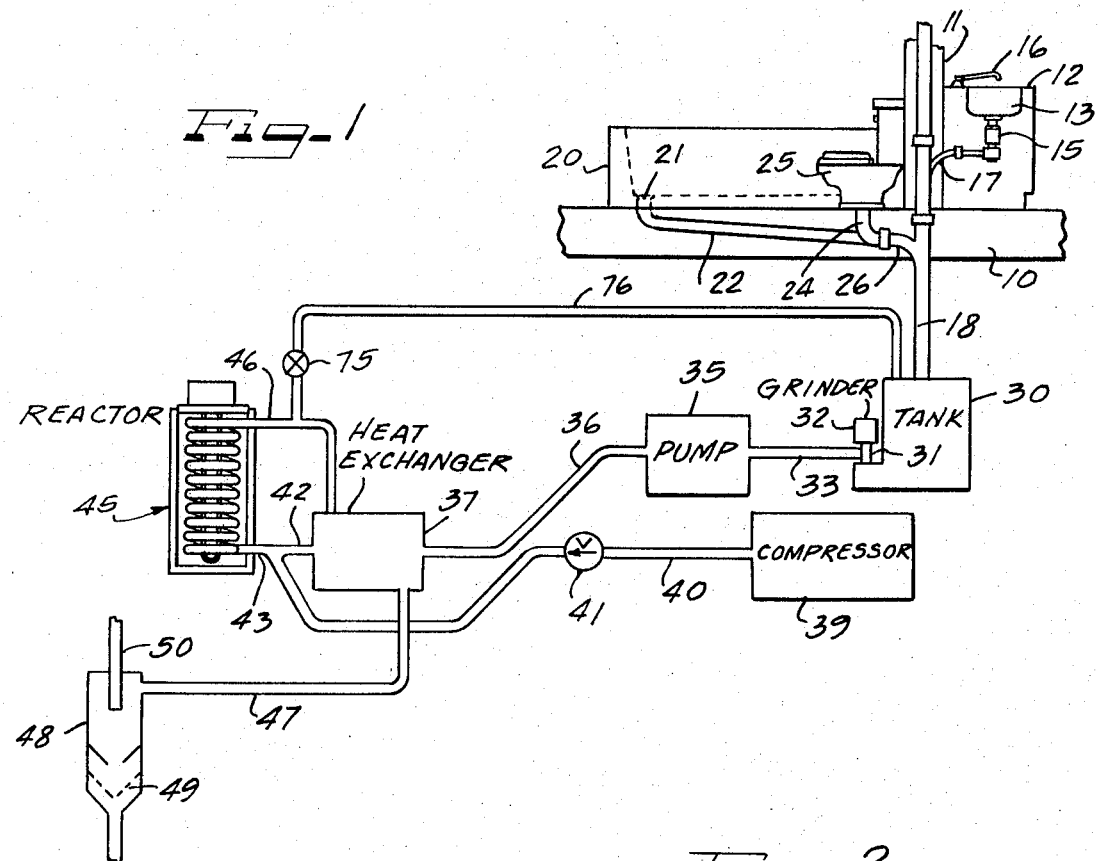
FIG. 1 is a schematic view showing a cross section through the bathroom and kitchen of a home in order to illustrate the waste generating means in a domestic environment and to show a hydraulic pumping diagram of a continuous wet oxidation system constructed in accordance with the principles of the present invention.

It should be understood that the reactor of the present invention is specifically designed and intended for use in a home system such that the reactor may be an appliance-type unit preferably located such as in a utility room closely adjacent to the home where economy in space of the unit is a prime factor in the design and construction of the reactor. In FIG. 1, we have shown in schematic form a floor construction 10 and a wall construction 11 partitioning the interior of a home into a kitchen and bathroom. We have, therefore, shown a kitchen counter 12 in which is located the bowl of a kitchen sink 13 which may be equipped with a garbage grinder or kitchen waste disposer 15. The bowl of the sink is supplied with water through a faucet 16 connected to the usual domestic supply and all of the waste from the kitchen including the products ground up in the waste disposer or garbage grinder 15 are directed through a plumbing conduit 17 into a drain conduit 18 extending in and along the wall construction 11 beneath the floor thereof into the basement of the home.

In the bathroom space, there is shown a bathtub 20 having a drain 21 discharging through a plumbing conduit 22 connected to a drain conduit 24 of a toilet 25. The drain conduit 24 has connection with the drain 18 through a branch fitting 26 of said drain. The toilet 25 has the usual flush box so that human waste deposited in the toilet 25 can be flushed through the drain conduit 24 into the drain 18.

All of the household wastes generated in the home may thus be directed to a common collecting tank 30 through the drain 18. The collecting tank 30 has an outlet 31 and may be of a size to accept all of the sewage, waste water and organic waste generated by a single family, as for example, a family of five people. A grinder 32 is in the outlet 31 and functions as a grinder-pump and operates to macerate the solids and mix the solid and liquid contents of the tank 30 to form an influent which can be passed through the oxidation reactor in accordance with the principles of the present invention, as in an application Ser. No. 312,194, filed Dec. 4, 1972 by George Boswinkle and Robert B. Wheaton and entitled "Continuous Wet Oxidation System for the Home."

As diagrammatically shown in FIG. 1, the influent is directed into a conduit 33 leading to the intake of a pump 35 for pumping the influent received from the grinder-pump 32 through the system at a rate which may be approximately 21 gallons per hour and a pressure range of from 1500 to 1600 p.s.i. The influent is discharged from the pump through a conduit 36 to a heat exchanger 37 which may be like the heat exchanger shown in the aforementioned application of George Boswinkle and Robert B. Wheaton and is no part of the present invention so need not be shown or described herein further. An air compressor 39 is provided to furnish sufficient air to provide oxygen to sustain a wet oxidation process. The air compressor may be a conventional motor operated air compressor and storage tank and has a discharge conduit 40 leading therefrom having a pressure regulating valve 41 therein. The conduit 40 is connected with a conduit 42 leading from the heat exchanger 37 and has connection with an inlet conduit 43 of a reactor 45 to supply air to mix with the influent or raw waste passing through the conduit 42. The reactor 45 forms the subject matter of the present invention and will hereinafter be more fully described as this specification proceeds. The raw waste leaves the reactor through a discharge conduit 46 in the form of clear water, $CO_2$, and a small amount of sterile residual ash, at a temperature in the order of 560° F. The conduit 46 leads to the heat exchanger 37 to preheat the influent passing through said heat exchanger. A conduit 47 leads from the heat exchanger to a liquid gas separator 48 having ash retainer vanes 49 therein to collect the sterile residual ash in the influent and having a gas vent 50 leading from the top thereof, operative to vent innocuous gases, mostly in the form of $CO_2$ to the atmosphere. The clarified reusable water is discharged out of the bottom of the liquid gas separator 48 for possible use in the home or for other utilitarian purposes.

Figure 2:
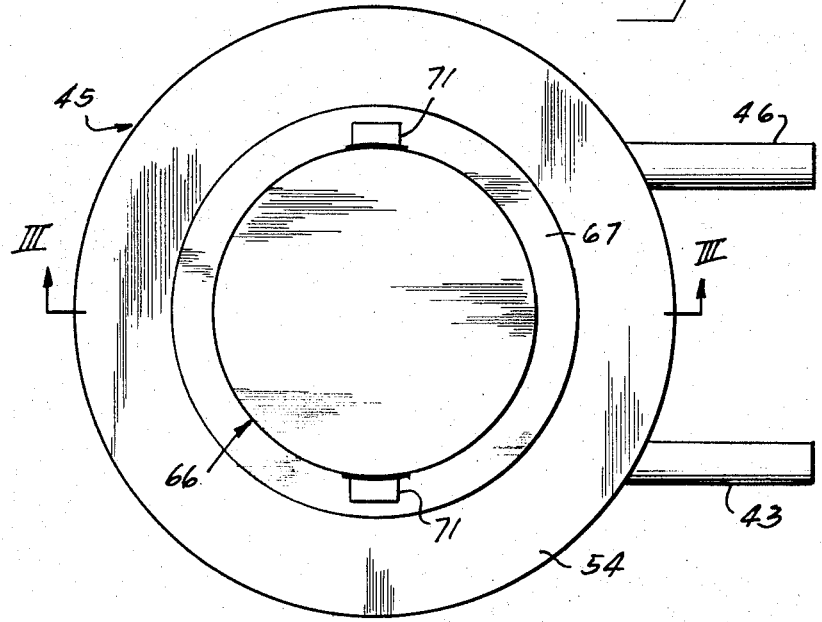
FIG. 2 is a top plan view of the reactor showing the inlet and outlet conduits leading to and from the reactor.

Referring now in particular to the reactor 45 as shown in FIGS. 2, 3 and 4, said reactor comprises a closed pressure vessel in the form of a coil of tubing 51 having the inlet conduit 43 formed as a continuation thereof. The coil 51 may be fabricated by coiling stainless steel tubing, to safely contain the high pressure by the hoop strength of the tubing. The inlet 43 of the tubing may have a sleeve and coupling nut 52 thereon for coupling to the conduit 42 in a conventional manner.

The reactor includes a cylindrical casing or housing extending upwardly of a metal base 53 and in the form of a thick wall of insulation 54 which may be encased with metal (not shown) and through which the inlet conduit 43 and the outlet conduit 46 pass. A cylindrical shell 55 extends within the insulation 54 and forms supports for the inlet conduit 43 and outlet conduit 46.

Referring now in particular to the support for the coil 51 within the shell 55, three support brackets 57 are spaced along the base 53 equal distances apart, as for example, 120° apart, and form gusseting supports for generally U-shaped supports 59 for the coil 51 and extending for the length thereof.

As shown in FIG. 3, the webs of the U-shaped supports have insulator strips 60 extending therealong abutting the outside of the coil. The legs of said supports are shown in FIG. 4 as having feet 61 extending laterally therefrom in abutting engagement with the inside of the shell 55 and suitably secured thereto. The bases of the webs of the supports are drilled at equally spaced intervals therealong to receive hook bolts 62 hooked about the coil 51. One such hook bolt is shown in FIG. 3 but it should be understood that each support 59 may have a plurality of hook bolts or other support means mounted therein and hooked about the coil.

A heating element terminal box 66 connected to a conventional electrical power source, not shown, has a base plate 67 closing the top of the shell 55 and having a plurality of hairpin-type rods or sheathed electrical resistance heating elements 69 spaced circumferentially thereabout and depending therefrom in intimate contact with the inside of the coil 51 for the length thereof. The terminal box 66 and elements 69 comprise a source of heat which may be a commercial form of heating element system, such as that supplied by Tru-Heat Corporation of Allegan, Michigan and is no part of the present invention except insofar as it provides a compact and efficient heating means for the waste material forced along the coil 51, to heat said material at sufficiently high temperatures to completely oxidize the material as it leaves the reactor through the outlet conduit 46.

In the event that it should be desirable to use other forms of heat such as hot water or steam, then the rods could be hollow and the source of heat would be correspondingly altered to constitute either a steam generator or a connection to a source of hot water.

The temperature of the waste as it leaves the heat exchanger may, for example, be in the order of 480° F. while the temperature of air entering the reactor and being forced with the waste through the heat exchanger may be of the order of 100° F. The length of the coil 51 is dependent on the flow rate of influent therethrough and is such as to completely oxidize the waste by the heat supplied by the electric heating element and the oxidation process itself, and bring the temperature of the waste as it leaves the reactor through the outlet conduit 46 up to a temperature of between 560° to 580° F.

For example, with a coil 51 having a diameter of approximately one inch, substantially all organic solids will be oxidized with a coil residence time of 45 minutes or less. Actually is has been determined that almost 60 percent of the oxidation occurs practically instantaneously and in the arrangement illustrated in the drawings, a coil residence time of 15–20 minutes will be adequate. However, for substantially complete oxidation, a coil residence time of 45 minutes is considered best.

The base of the heating element terminal box may be secured to the reactor as by machine screws (not shown) and has a casing 70 extending upwardly therefrom closed at its top and having diametrically opposed fittings 71 extending outwardly therefrom for electrical conduits connected to energize the sheathed electric resistance heating elements 69. The casing 70 may contain a thermostat (not shown) and energizing connections from the thermostat to the heating elements, which are not herein shown or described since they form no part of the present invention. The outlet conduit 46 is shown in FIG. 3 as having a T-fitting 71 therein with a safety valve 75 connected in said T-fitting. A pipe 76 leads from said T-fitting and is connected to the tank 30, to return at least part of the effluent to said tank upon excessive pressure and temperature conditions.

The embodiments of the invention in which an exclusive property or privilege is claimed are defined as follows:

1. In a continuous process wet oxidation apparatus for home sewage treatment systems, for treating the organic waste sewage from the home by the wet oxidation process, means forming a continuous hydraulic circuit and including in series connection with one another, a tank, a pump, a heat exchanger and a reactor, and means for supplying oxygen under pressure to the sewage as it enters said reactor, said reactor comprising a pressure vessel, having
   a coil of tubing having an inlet at one end thereof for receiving in combination raw waste and oxygen passing from the heat exchanger and the means for supplying oxygen and having an outlet at its opposite end through which hot, oxidized effluent is discharged from said vessel and said coil of tubing being of sufficient length relative to its cross-section to provide coil residence time of the material passing therethrough sufficient to complete oxidation of substantially all organic solids pumped through said coil at a preselected rate, a housing for said reactor including a heat insulating sheath extending from said coil, and a source of heat in said reactor extending along said coil in intimate relation therewith to maintain a constant temperature along said coil and supply the heat to said coil to completely oxidize the waste as passing from said inlet to said outlet.

2. The continuous process reactor of claim 1, including a base for said housing, support means for said coil extending upwardly from said base and wherein the source of heat extends through said coil along the inside thereof in intimate relation therewith.

3. The continuous process reactor of claim 2, wherein the source of heat is an electric heating element including at least one rod of a hairpin form, and means supplying electric energy to heat said rod.

4. The continuous process reactor of claim 1, wherein a plurality of heating elements extend along the inside of said coil in intimate relation therewith for the entire length of the coil.

5. The continuous process reactor of claim 4, wherein the source of heat comprises a plurality of electric heating elements of the rod type of a generally hairpin form and means supplying electric energy to heat said rod.

6. The continuous process reactor of claim 1, including a base having said insulating sheath extending upwardly from said base, a metal lining within said insulating sheath extending therealong for the length thereof, a plurality of coil supports spaced about said base and extending upwardly therefrom along the inside of said metal lining, support brackets for said coil supports mounted on said base and gusseting said coil supports to said base into engagement with said metal lining, said coil supports being generally channel-like in cross section and having webs facing the coil, legs extending from said webs to said metal lining, and hook means extending from said webs in supporting engagement with the coil.

7. The continuous process reactor of claim 6, wherein the source of heat includes an electric heating element, wherein a support plate for the heating element is disposed at the top of said metal lining, and wherein a plurality of hairpin-type electric heating elements depend from said support plate along the inside of said coil in intimate relation therewith for substantially the length thereof.

8. The continuous process reactor of claim 7, wherein insulating strips are disposed between said webs of said coil supports and said coil, and wherein the electric heating elements comprise rods of a hairpin form circumferentially spaced along the inside of said coil, and means supplying electric energy to said rods.

9. The continuous process reactor of claim 8, wherein the coil is formed by coiling stainless steel tubing of a length proportioned to the flow rate of influent through the coil, to provide sufficient residence time in the reactor to complete the oxidation process.

* * * * *

UNITED STATES PATENT OFFICE
CERTIFICATE OF CORRECTION

Patent No. 3,844,948           Dated October 29, 1974

Inventor(s) Harry Dennis Burke et al.

It is certified that error appears in the above-identified patent and that said Letters Patent are hereby corrected as shown below:

Column 5, line 10, change the word "from" to read --about--.

Signed and sealed this 14th day of January 1975.

(SEAL)
Attest:

McCOY M. GIBSON JR.
Attesting Officer

C. MARSHALL DANN
Commissioner of Patents